(12) United States Patent
Bartunov et al.

(10) Patent No.: US 12,277,487 B2
(45) Date of Patent: Apr. 15, 2025

(54) ENERGY-BASED ASSOCIATIVE MEMORY NEURAL NETWORKS

(71) Applicant: DeepMind Technologies Limited, London (GB)

(72) Inventors: Sergey Bartunov, London (GB); Jack William Rae, London (GB); Timothy Paul Lillicrap, London (GB); Simon Osindero, London (GB)

(73) Assignee: DeepMind Technologies Limited, London (GB)

( * ) Notice: Subject to any disclaimer, the term of this patent is extended or adjusted under 35 U.S.C. 154(b) by 769 days.

(21) Appl. No.: 17/441,463

(22) PCT Filed: May 19, 2020

(86) PCT No.: PCT/EP2020/063971
§ 371 (c)(1),
(2) Date: Sep. 21, 2021

(87) PCT Pub. No.: WO2020/234299
PCT Pub. Date: Nov. 26, 2020

(65) Prior Publication Data
US 2022/0180147 A1   Jun. 9, 2022

Related U.S. Application Data

(60) Provisional application No. 62/852,196, filed on May 23, 2019.

(51) Int. Cl.
*G06N 3/04* (2023.01)

(52) U.S. Cl.
CPC .................................... *G06N 3/04* (2013.01)

(58) Field of Classification Search
CPC .......... G06N 3/04; G06N 3/044; G06N 3/045; G06N 3/006; G06N 5/01; G06N 3/084
See application file for complete search history.

(56) References Cited

PUBLICATIONS

Jianwen Xie et al: "Cooperative Training of Descriptor and Generator Networks", arxiv.org, Cornell University Library, 201 OLIN Library Cornell University Ithaca, NY 14853, <b>Sep. 29, 2016</b> (<b>Sep. 29, 2016</b>), XP081418693 Cooperative Training of Descriptor and Generator Networks (Year: 2016).*

(Continued)

*Primary Examiner* — Pei Yong Weng
(74) *Attorney, Agent, or Firm* — Fish & Richardson P.C.

(57) ABSTRACT

Methods, systems, and apparatus, including computer programs encoded on a computer storage medium, for implementing associative memory. In one aspect a system comprises an associative memory neural network to process an input to generate an output that defines an energy corresponding to the input. A reading subsystem retrieves stored information from the associative memory neural network. The reading subsystem performs operations including receiving a given, i.e. query, input and retrieving a data element from the associative memory neural network that is associated with the given input. The retrieving is performed by iteratively adjusting the given input using the associative memory neural network.

20 Claims, 5 Drawing Sheets

ASSOCIATIVE MEMORY SYSTEM
100

(56) References Cited

PUBLICATIONS

Amos, "Differentiable Optimization-Based Modeling for Machine Learning," Thesis for the degree of Doctor of Philosophy, Carnagie Mellon University, School of Computer Science, May 2019, 156 pages.
Andrychowicz et al., "Learning to learn by gradient descent by gradient descent," Advances in Neural Information Processing Systems 29, 2016, pp. 3981-3989.
Antoniou et al., "How to train your MAML," CoRR, Oct. 2018, arXiv:1810.09502, 11 pages.
Ba et al., "Using fast weights to attend to the recent past," Advances in Neural Information Processing Systems, 2016, 29:4331-4339.
Bartunov et al., "Fast adaptation in generative models with generative matching networks," CoRR, Dec. 2016, arXiv:1612.02192, 16 pages.
Belanger et al., "End-to-end learning for structured prediction energy networks," Proceedings of the 34th International Conference on Machine Learning, 2017, 70:429-439.
Candes et al., "Near optimal signal recovery from random projections: universal encoding strategies?," IEEE Transactions on Information Theory, Dec. 2006, 52(12):5406-5425.
Chung et al., "Empirical evaluation of gated recurrent neural networks on sequence modeling," CoRR, Dec. 2014, arXiv:1412.3555, 9 pages.
Du et al., "Implicit generation and generalization in energy-based models," CoRR, Mar. 2019, arXiv:1903.08689, 21 pages.
Finn et al., "Model-agnostic meta-learning for fast adaptation of deep networks," Proceedings of the 34th International Conference on Machine Learning, Aug. 2017, 70:1126-1135.
Goodfellow et al., "Generative adversarial nets," Advances in neural information processing systems, 2014, 27:2672-2680.
Graves et al., "Hybrid computing using a neural network with dynamic external memory," Nature, Oct. 2016, 538(7626):471-476.
Gregor et al., "Towards conceptual compression," Advances In Neural Information Processing Systems 29, 2016, pp. 3549-3557.
He et al., "Deep residual learning for image recognition," Proceedings of the IEEE Conference on Computer Vision and Pattern Recognition, 2016, pp. 770-778.
He et al., "Delving deep into rectifiers: Surpassing human-level performance on imagenet classification," Proceedings of the IEEE International Conference on Computer Vision, 2015, pp. 1026-1034.
Hinton et al., "A fast learning algorithm for deep belief nets," Neural Computation, Jul. 2006, 18(7):1527-1554.
Hinton et al., "Unsupervised discovery of nonlinear structure using contrastive backpropagation," Cognitive Science, Feb. 2010, 30(4):725-731.
Hinton, "A practical guide to training restricted boltzmann machines," Neural Networks: Tricks of the Trade, 2012, pp. 599-619.
Hochreiter et al., "Learning to learn using gradient descent," International Conference on Artificial Neural Networks, Aug. 2001, pp. 87-94.
Hochreiter et al., "Long short-term memory," Neural Computation, Nov. 1997, 9(8):1735-1780.
Hopfield, "Neural networks and physical systems with emergent collective computational abilities," PNAS, Apr. 1982, 79(8):2554-2558.
International Preliminary Report on Patentability in International Appln. No. PCT/EP2020/063971, dated Nov. 16, 2021, 10 pages.
International Search Report and Written Opinion in International Appln. No. PCT/EP2020/063971, dated Aug. 14, 2020, 12 pages.
Jaderberg et al., "Decoupled neural interfaces using synthetic gradients," Proceedings of the 34th International Conference on Machine Learning, 2017, 70:1627-1635.
Johnson et al., "Perceptual losses for real-time style transfer and super-resolution," European Conference on Computer Vision, Sep. 2016, pp. 694-711.
Kingma et al., "Auto-encoding variational bayes," CoRR, Dec. 2013, arXiv:1312.6114, 14 pages.
Kraska et al., "The case for learned index structures," SIGMOD '18: Proceedings of the 2018 International Conference on Management of Data, May 2018, pp. 489-504.
Krotov et al., "Dense associative memory for pattern recognition," Advances in Neural Information Processing Systems 29, 2016, pp. 1172-1180.
Lake et al., "Human-level concept learning through probabilistic program induction," Science, Dec. 2015, 350(6266):1332-1338.
LeCun et al., "Convolutional networks for images, speech, and time series," The handbook of brain theory and neural networks, Apr. 1995, 3361(10):1995.
Liao et al., "Reviving and improving recurrent back-propagation," Proceedings of the 35th International Conference on Machine Learning, 2018, 80:3082-3091.
Loshchilov et al., "Fixing weight decay regularization in adam," arXiv preprint arXiv:1711.05101, Feb. 2018, 14 pages.
Maclaurin et al., "Gradient-based hyperparameter optimization through reversible learning," Proceedings of the 32nd International Conference on Machine Learning, 2015, 37:2113-2122.
Marino et al., "Iterative amortized inference," Proceedings of the 35th International Conference on Machine Learning, 2018, 80:3403-3412.
Miconi et al., "Differentiable plasticity: training plastic neural networks with backpropagation," Proceedings of the 35th International Conference on Machine Learning, 2018, 80:3559-3568.
Munkhdalai et al., "Metalearned neural memory," CoRR, Jul. 2019, arxiv.org/abs/1907.09720, 25 pages.
Nesterov, "A method for solving the convex programming problem with convergence rate $O(1/k/2)$," Dokl. Akad. Nauk SSSR, 1983, 269:543-547.
Nijkamp et al., "On learning non-convergent short-run mcmc toward energy-based model," CoRR, Apr. 2019, arXiv:1904.09770, 15 pages.
Parkhi et al., "Deep face recognition," BMVC, 2015, 1:12 pages.
Putzky et al., "Recurrent inference machines for solving inverse problems," CoRR, Jun. 2017, arXiv:1706.04008, 10 pages.
Rae et al., "Meta-learning neural bloom filters," Proceedings of the 36th International Conference on Machine Learning, 2019, 97:5271-5280.
Reed et al., "Few-shot autoregressive density estimation: Towards learning to learn distributions," CoRR, Oct. 2017, arXiv:1710.10304, 11 pages.
Rezende et al., "Stochastic backpropagation and approximate inference in deep generative models," Proceedings of the 31st International Conference on Machine Learning, 2014, 32(2):1278-1286.
Salakhutdinov et al., "Efficient learning of deep boltzmann machines," Proceedings of the thirteenth international conference on artificial intelligence and statistics, 2010, 9:693-700.
Santoro et al., "Meta learning with memory-augmented neural networks," Proceedings of The 33rd International Conference on Machine Learning, 2016, 48:1842-1850.
Seung et al., "Learning Continuous Attractors in Recurrent Networks," NIPS '97: Proceedings of the 10th International Conference on Neural Information Processing Systems, Dec. 1997, pp. 654-660.
Storkey et al., "The basins of attraction of a new hopfield learning rule," Neural Networks, Jul. 1999, 12(6):869-876.
Toderici et al., "Full resolution image compression with recurrent neural networks," Proceedings of the IEEE Conference on Computer Vision and Pattern Recognition, 2017, pp. 5306-5314.
Ulyanov et al., "Deep image prior," Proceedings of the IEEE Conference on Computer Vision and Pattern Recognition, 2018, pp. 9446-9454.
Vinyals et al., "Matching networks for one shot learning," Advances in neural information processing systems, 2016, pp. 3630-3638.
Wallace et al., "The jpeg still picture compression standard," IEEE Transactions on Consumer Electronics, Feb. 1992, 38(1):xviii-xxxiv.
Weston et al., "Memory networks," CoRR, Oct. 2014, arXiv:1410.3916, 15 pages.
Willshaw et al., "Non-holographic associative memory," Nature, Jun. 1969, 222(5197):960-962.

(56) References Cited

PUBLICATIONS

Wu et al., "Learning attractor dynamics for generative memory," CoRR, Nov. 2018, arxiv.org/abs/1811.09556, 14 pages.

Xie et al., "A Theory of Generative ConvNet," Proceedings of The 33rd International Conference on Machine Learning, 2016, 48:2635-2644.

Xie et al., "Cooperative Training of Descriptor and Generator Networks," IEEE Transactions on Pattern Analysis and Machine Intelligence, Jan. 2020, 42(1):18 pages.

Yoon et al., "Specific evidence of low-dimensional continuous attractor dynamics in grid cells," Nature Neuroscience, Jul. 2013, 16(8):1077.

Zhang et al., "Understanding deep learning requires rethinking generalization," Communications of the ACM, Mar. 2021, 64(3):107-115.

Office Action in European Appln. No. 20727262.6, dated Aug. 13, 2024, 12 pages.

\* cited by examiner

ENERGY-BASED ASSOCIATIVE MEMORY NEURAL NETWORKS

CROSS-REFERENCE TO RELATED APPLICATION

This application is a National Stage Application under 35 U.S.C. § 371 and claims the benefit of International Application No. PCT/EP2020/063971, filed May 19, 2020, which claims priority to U.S. Application No. 62/852,196, filed May 23, 2019, the disclosure of which is incorporated herein by reference.

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes an associative memory system implemented as computer programs on one or more computers in one or more locations that can store data in, and subsequently retrieve data from, an associative memory neural network. As used throughout this specification, the associative memory neural network may be said to "store" a data element if the parameters of the associative memory neural network encode information that enables the data element to be retrieved, i.e., approximately or exactly reconstructed. Storing a data element in the associative memory neural network may be referred to as "writing" the data element to the associative memory neural network. Retrieving a data element from the associative memory neural network may be referred to as "reading" the data element from the associative memory neural network.

According to a first aspect there is provided a system comprising an associative memory neural network having a plurality of associative memory parameters that is configured to process an input to generate an output that defines an energy corresponding to the input. The system includes a reading subsystem i.e. a subsystem to retrieve stored information, i.e. a data element, from the associative memory neural network. The reading subsystem is configured to perform operations including receiving a given input, as described later a query data element, and retrieving from the associative memory neural network a target input that is associated with the given input, as described later a retrieved data element. The retrieving is performed by iteratively adjusting the given input using the associative memory neural network.

The retrieving comprises, at each of one or more iterations, processing the given input, using the associative memory neural network and in accordance with current values of the associative memory parameters, to generate an energy corresponding to the given input. The retrieving further comprises determining a gradient of a reading objective function that depends on the energy corresponding to the given input with respect to the given input, and using the gradient to adjust the given input e.g. using any gradient descent/ascent process to optimize the reading objective function. The retrieving further comprises providing the given input after a final iteration of the one or more iterations as the target input that is associated with the given input.

Conceptually the associative memory neural network may be viewed as implementing an energy model having attractors which locally optimize, e.g. minimize, an energy which may be represented by a real scalar value. Information is stored in the parameters, e.g. weights, of the associative memory neural network as local optima, e.g. minima, of the energy correspond to stored data elements. The retrieval, in implementations, uses gradient descent to find an attractor i.e. a local minimum of the energy, starting from an initial given input i.e. the query data element. Thus the reading objective function is an objective function which depends on the energy corresponding to the given input at an iteration (no specific form is required). The gradient descent adjusts the query data element towards a stored data element to provide the retrieved data element. Thus, for example, the query data element may be an incomplete or distorted version of the retrieved data element. Implementations of the described techniques facilitate the storage of complex, high-dimensional data elements such as natural images.

Thus the given input (the query data element), and the target input (the retrieved data element), may each include image data, audio data e.g. digitized sound data, or text data.

The system may also include a writing subsystem configured to perform operations comprising receiving one or more inputs to be stored and storing the inputs using the associative memory neural network. This may comprise, at each of one or more iterations, processing each of the inputs, using the associative memory neural network and in accordance with current values of the plurality of associative memory parameters, to generate a respective energy corresponding to each of the inputs; determining gradients of a writing objective function that depends on the energy, corresponding to each of the inputs, with respect to e.g. a specified subset of the associative memory parameters; and using the gradients to adjust the current values of e.g. the specified subset of the associative memory parameters. That is, in implementations only some of the associative memory parameters may be adjusted i.e. the specified subset of parameters e.g. those of one or more of the highest layers (the layers furthest from the input). In some implementations the writing objective function may also include a term dependent on a gradient of the energy e.g. on a magnitude of the gradient of the energy, and/or a term which limits deviation from the initial associative memory parameters.

One or both of the writing subsystem and the reading subsystem may write data to and/or read data from the associative memory neural network by performing truncated gradient descent, i.e., that terminates after (at most) a predetermined number of gradient descent iterations on the writing objective function and/or reading objective function.

In implementations the system may be trained using meta-learning. For example the system may be trained so that the associative memory parameters define a good starting point for past optimization. More specifically the system may be trained by writing and reading data elements and backpropagating gradients of a reconstruction error function to provide initial values for the associative memory parameters. This is facilitated by using a writing objective function as previously described. Then only one or a few further gradient descent (or ascent) steps may be needed during reading or writing.

The reconstruction error objective function may characterize a similarity between a training input stored using the writing subsystem and a training input which is a retrieved input provided by the reading subsystem (in response e.g. to an incomplete or distorted version of the training input).

For example, in implementations the reading subsystem has one or more reading subsystem parameters that are used in retrieving target inputs from the associative memory neural network and the writing subsystem has one or more writing subsystem parameters that are used in storing inputs using the associative memory neural network. In implementations the reading objective function may also have one or more reading objective function parameters, and the writing objective function may have one or more writing objective function parameters. The system may include a training subsystem that is configured to jointly train one or more of: the reading subsystem parameters, the writing subsystem parameters, the reading objective function parameters, the writing objective function parameters, and the associative memory parameters based on a reconstruction error objective function e.g. using meta-learning techniques.

Particular embodiments of the subject matter described in this specification can be implemented so as to realize one or more of the following advantages.

The associative memory system described in this specification can compress data more efficiently, and retrieve stored data at least as accurately, as some conventional memory systems. By enabling efficient data compression and accurate data retrieval, the associative memory system facilitates more efficient use of computational resources (e.g., memory).

The associative memory system implements a memory (data store) that allows data to be efficiently compressed (stored) and retrieved. For example, the associative memory system can write data to and read data from the associative memory neural network by performing truncated gradient descent, i.e., that terminates after (at most) a predetermined number of gradient descent iterations rather than, e.g., when a convergence criterion is satisfied. Using truncated gradient descent to write and read data enables the associative memory system to implement fast write and read operations that are performed over a predetermined number of gradient descent iterations. The parameters of the associative memory system can be trained using meta-learning techniques to enable truncated gradient descent to converge sufficiently fast that data elements can be read from the associative memory neural network with an acceptable reconstruction error, as will be described in more detail below. By enabling fast write and read operations, the associative memory system facilitates more efficient use of computational resources (e.g., computing power).

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
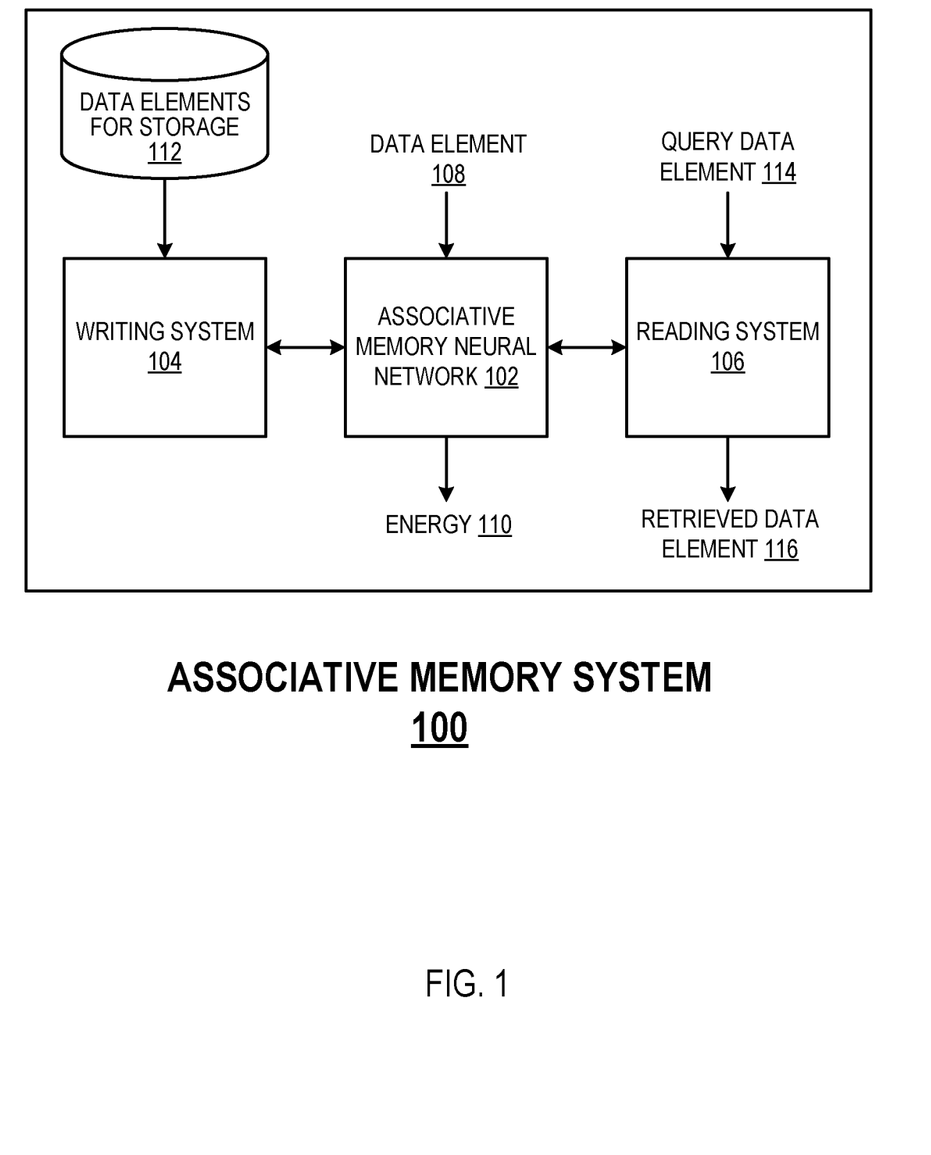
FIG. 1 shows an example associative memory system.

FIG. 1 shows an example associative memory system 100. The associative memory system 100 is an example of a system implemented as computer programs on one or more computers in one or more locations in which the systems, components, and techniques described below are implemented.

The associative memory system 100 includes an associative memory neural network 102, a writing system 104, and a reading system 106, which will each be described in more detail next.

The associative memory neural network 102 is configured to receive a data element 108, and to process the data element 108 in accordance with values of a set of associative memory neural network parameters to generate a corresponding energy 110.

The data element 108 may include one or more of: image data, text data, audio data, or any other appropriate form of data.

The energy 110 may be represented, e.g., as a scalar numerical value. The system 100 may train the neural network 102 to generate an energy value 110 for a data element 108. The energy value may be interpreted as characterizing a likelihood that the data element 108 is stored in the neural network 102, as will be described in more detail below.

The neural network 102 may have any appropriate neural network architecture that enables it to process data elements 108 to generate corresponding energy values 110. For example, the neural network 102 may be a convolutional neural network, i.e., that includes one or more convolutional neural network layers, that is configured to process images. As another example, the neural network 102 may be a convolutional neural network or a recurrent neural network (i.e., with one or more recurrent neural network layers, e.g., long short-term memory (LSTM) neural network layers) that is configured to process audio data or text data. Generally, the neural network 102 may include any appropriate types of neural network layers, e.g., convolutional neural network layers, recurrent neural network layers, pooling neural network layers, and/or attention neural network layers. In some implementations, the output layer of the neural network 102 includes a single neuron that outputs scalar energy values 110 corresponding to data elements 108 processed by the neural network 102. The neural network 102 may have one or more layers including a tan h activation function.

The writing system 104 is configured to store a set of one or more data elements 112 in the neural network 102 by training the neural network 102 on the data elements 112 to optimize an objective function, referred to herein as a "writing" objective function. The writing objective function may encourage the neural network 102 to minimize (or, alternatively, maximize) the energy values 110 generated for the data elements 112 being stored in the neural network 102. For example, the writing objective function may encourage the energy values 110 for the data elements 112 being stored to be local minima of the energy values generated by the neural network 102.

The writing objective function $\mathcal{W}(x, \theta)$ for a data element x (i.e., that is being stored) may be given by, e.g.:

$$\mathcal{W}(x, \theta) = E(x; \theta) + \alpha \cdot |\nabla_\theta E(x; \theta)|_2^2 + \beta |\theta - \overline{\theta}|_2^2 \quad (1)$$

where $E(x;\theta)$ denotes the energy value generated by the neural network 102 for data element x in accordance with the neural network parameter values $\theta$, $|\nabla E(x;\theta)|_2^2$ denotes a magnitude of the gradient of the energy value $E(x;\theta)$ with respect to the neural network parameters $\theta$, $\overline{\theta}$ denotes the initial values of the neural network parameters (e.g., prior to being trained to optimize the writing objective function), and $\alpha$ and $\beta$ are constant terms.

The terms $E(x;\theta)$ and $|\nabla_\theta E(x;\theta)|_2^2$ in equation (1) may encourage the energy values corresponding to the data values being stored to be local minima of the energy values generated by the neural network 102, which facilitates subsequent retrieval of the data values from the neural network, as will be described in more detail below. The term $|\theta - \overline{\theta}|_2^2$ in equation (1) may limit the deviation of the parameter values $\theta$ from their initial values $\overline{\theta}$, which may improve the stability of the optimization of the writing objective function. The writing objective function in equation (1) is provided for illustrative purposes only, and other writing objective functions are possible.

To store the data elements 112 in the neural network 102, the writing system 104 may train the neural network 102 on the data elements 112 to optimize the writing objective function over one or more iterations using gradient descent. For example, the values $\theta^{(t)}$ of the neural network parameters at each iteration t may be given by:

$$\theta^{(0)} = \overline{\theta} \quad (2)$$

$$\theta^{(t+1)} = \theta^{(t)} - \eta^{(t)} \frac{1}{N} \sum_{i=1}^{N} \nabla_\theta \mathcal{W}(x_i, \theta^{(t)}) \quad (3)$$

where $\overline{\theta}$ denotes the initial values of the neural network parameters, $\eta^{(t)}$ denotes a learning rate parameter for iteration t, N denotes the number of data elements 112 being stored in the neural network 102, and $\nabla_\theta \mathcal{W}(x_i, \theta^{(t)})$ denotes a gradient of the writing objective function, evaluated for data element $x_i$ (i.e., the i-th data element being stored) and parameter values $\theta^{(t)}$, with respect to the neural network parameters. The learning rate $\eta^{(t)}$ scales the gradients of the writing objective function. The values of the neural network parameters after the final iteration of gradient descent may be understood as storing the data elements 112. In some cases, the writing system 104 may use an alternative gradient descent optimization rule (i.e., other than the one specified in equation (3)), e.g., a Nesterov momentum gradient descent optimization rule (Nesterov, "A method for solving the convex programming problem with convergence rate O(1/k^2)", Dokl. akad. nauk Sssr, vol. 269, pp. 543-547, 1983). The writing system 104 may perform truncated gradient descent, i.e., by performing a predetermined number of gradient descent iterations (e.g., five iterations, or any other appropriate number of iterations) to store the data elements 112 in the neural network parameters.

In some implementations, the writing system may compute the gradients of the writing objective function (e.g., $\nabla_\theta \mathcal{W}(x_i, \theta^{(t)})$ in equation (3)) with respect to only a proper subset of the neural network parameters. Moreover, certain terms in the writing objective function (e.g., the gradient term $|\nabla_\theta E(x;\theta)|_2^2$ and the difference term $|\theta - \overline{\theta}|_2^2$ in equation (1)) may be computed with respect to only the proper subset of the neural network parameters. The proper subset of the neural network parameters may e.g., the parameters of one or more "highest" layers of the neural network 102. The height of a given neural network layer may refer to the number of intermediate layers between the given neural network layer and the input layer. Updating only a proper subset of the neural network parameters based on the writing objective function may improve the performance of the system, e.g., by enabling the remaining neural network layers to perform feature extraction that is invariant to the data elements stored in the neural network.

The reading system 106 may be used to retrieve (approximate or exact) reconstructions of the data elements 112 from the neural network 102, i.e., after the writing system 104 has stored the data elements 112 in the neural network 102. More specifically, the reading system 106 is configured to process a "query" data element 114 to generate a "retrieved" data element 116. The query data element 114 may be, e.g., an incomplete or distorted version of a given data element 112 stored in the neural network 102, and the retrieved data element 116 may be an (approximate or exact) reconstruction of the given data element 112.

To generate a retrieved data element 116 corresponding to a query data element 114, the reading system 106 may iteratively adjust the query data element 114 to optimize an objective function, referred to herein as "reading" objective function. After the last update iteration, the reading system 106 may provide the (adjusted) query data element 114 as the retrieved data element 116.

The reading objective function may encourage the query data element 114 to minimize (or, alternatively, maximize) the energy value generated by the neural network 102 by processing the query data element 114. For example, the reading objective function may encourage the query data element 114 to achieve a local minimum of the energy values generated by the neural network 102. The reading objective function $\mathcal{R}(x)$ for a query data element x may be given by:

$$\mathcal{R}(x) = E(x; \theta) \quad (4)$$

where $E(x;\theta)$ denotes the energy value generated by the neural network 102 by processing the query data element x in accordance with the neural network parameters $\theta$. The reading objective function in equation (4) is provided for illustrative purposes only, and other reading objective functions are possible.

To generate the retrieved data element 116, the reading system 106 may iteratively adjust the query data element 114 to optimize the reading objective function using gradient descent over one or more iterations. The value $x^{(k+1)}$ of the query data element at iteration (k+1) may be given by:

$$x^{(0)} = x_q \quad (5)$$

-continued $$x^{(k+1)} = x^{(k)} - \gamma^{(k)} \nabla_x \mathcal{R}(x^{(k)}) \quad (6)$$

where $x_q$ denotes the initial value of the query data element, $x^{(k)}$ denotes the query data element at iteration k, $\gamma^{(k)}$ denotes a learning rate parameter for iteration k, and $\nabla_x \mathcal{R}(x^{(k)})$ denotes a gradient of the reading objective function, evaluated for data element $x^{(k)}$, with respect to data element $x^{(k)}$. The learning rate $\gamma^{(k)}$ scales the gradients of the reading objective function. The gradient $\nabla_x \mathcal{R}(x^{(k)})$ may be computed, e.g., by backpropagating a gradient of the reading objective function through the neural network 102 to the data element $x^{(k)}$ provided as input to the neural network 102. After the last update iteration, the reading system 106 may provide the (adjusted) query data element 114 as the retrieved data element 116. In some cases, the reading system 106 may use an alternative gradient descent optimization rule (i.e., other than the one specified in equation (6)), e.g., a Nesterov momentum gradient descent optimization rule. The reading system 106 may perform truncated gradient descent, i.e., by performing a predetermined number of gradient descent iterations (e.g., five iterations, or any other appropriate number of iterations) to generate the retrieved data element 116.

Figure 2:
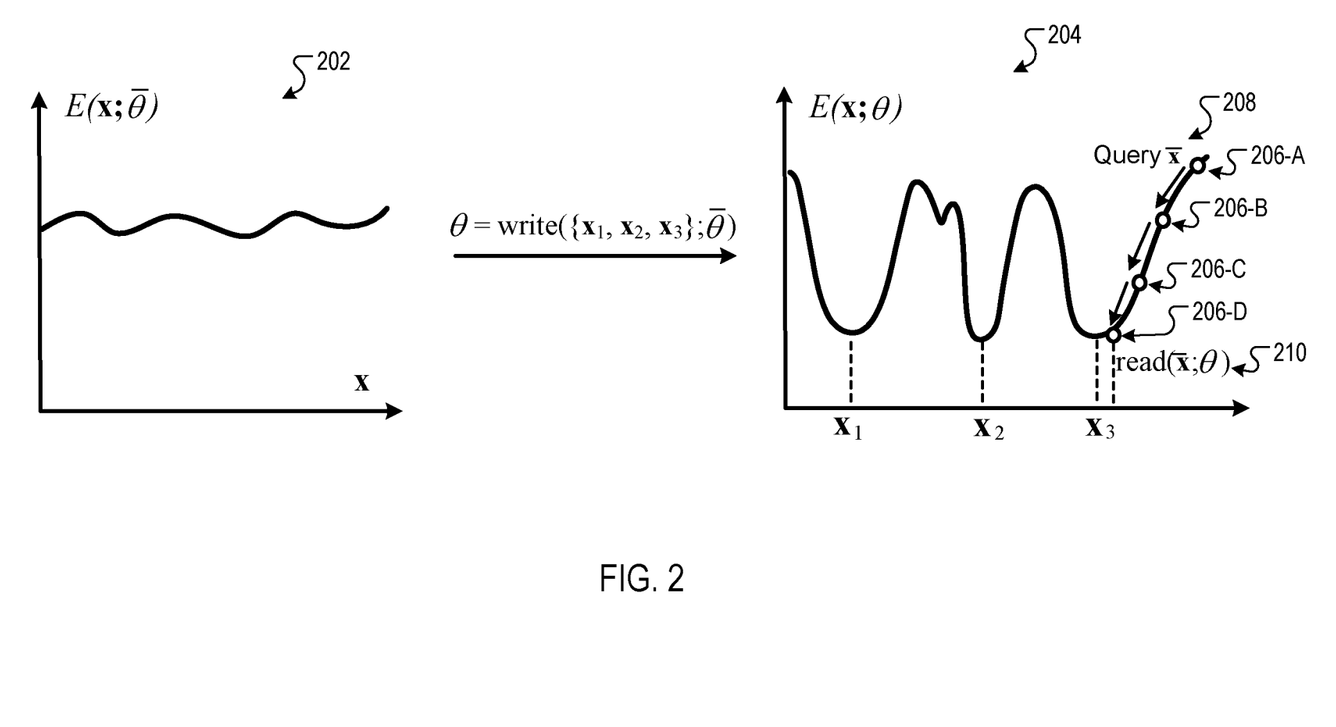
FIG. 2 shows graphs that illustrate the energy values generated by an associative memory neural network.

The writing system 104, as described above, may train the neural network 102 to encourage the stored data elements 112 to correspond to local minima of the energy values generated by the neural network 102. By iteratively adjusting a query data element 114 to encourage its energy value to achieve a local minimum, the reading system 106 may cause the query data element 114 to converge to a corresponding data element stored in the neural network 102. FIG. 2 provides an illustration of the storing data elements in, and subsequently retrieving data elements from, a neural network.

The writing system 104 and the reading system 106 may perform write/read operations by truncated gradient descent, i.e., by performing a predetermined number of iterations of gradient descent to optimize a writing/reading objective function. The speed of convergence of the truncated gradient descent operations performed by the writing system 104 and the reading system 106 may be impacted by the values of the system parameters, e.g.: the initial values of the associative memory neural network parameters (i.e., denoted by $\bar{\theta}$ in equation (2)), parameters of the reading system 106 (e.g., the learning rate parameters $\{\gamma^{(k)}\}$ referenced in equation (6)), parameters of the writing system (e.g., the learning rate parameters $\{\eta^{(t)}\}$ referenced in equation (3)), parameters of the reading objective function, and parameters of the writing objective function (e.g., the $\alpha$, $\beta$ parameters referenced in equation (1)).

A training engine can use machine learning training techniques, referred to as "meta-learning" techniques, to train the system parameters to optimize a reconstruction error objective function. The reconstruction error objective function may characterize an error between: (i) input data elements that are written to the neural network 102, and (ii) corresponding retrieved data elements that are read from the neural network 102, e.g., based on incomplete or distorted versions of the input data elements. For example, the reconstruction error objective function $\mathcal{L}$ for a set of input (training) data elements $X = \{x_i\}_{i=1}^{N}$ may be given by:

$$\mathcal{L}(X) = \frac{1}{N} \sum_{i=1}^{N} \left| x_i - \text{read}(\hat{x}_i; \theta) \right|_2^2 \quad (7)$$

where $\hat{x}_i$ denotes an incomplete or distorted version of $x_i$, and read($\hat{x}_i$; $\theta$) denotes a retrieved data element that is generated by the reading system 106 by processing $\hat{x}_i$ based on neural network parameters $\theta$ after the writing system 104 has written the set of input data elements X to the neural network 102. An incomplete or distorted version of a data element may be generated, e.g., by adding random noise to the data element or by masking a portion of the data element. Masking a portion of a data element may refer to replacing a portion of the data element by default (i.e., predefined) data. The reconstruction error objective function in equation (7) is provided for illustrative purposes only, and other reconstruction error objective functions are possible.

The training engine may determine final values of the system parameters by adjusting the values of the system parameters, starting from initial values of the system parameters, over multiple training iterations. The training engine may determine the initial values of the system parameters in any appropriate manner. For example, the training engine may randomly sample the initial values of the neural network parameters from a probability distribution, e.g., a standard Normal distribution.

Training the system parameters to optimize a reconstruction error objective function may enable the truncated gradient descent operations performed by the system 100 to converge sufficiently fast to allow data elements to be read from the neural network with an acceptable reconstruction error. An example meta-learning technique that can be used to train the system parameters to optimize a reconstruction error objective function is the model-agnostic meta-learning (MAML) technique described with reference to: Chelsea Finn et al.: "Model-agnostic meta-learning for fast adaptation of deep networks," ICML '17: Proceedings of the 34th International Conference on Machine Learning, Volume 70, August 2017, pages 1126-1135.

The system 100 can be used in any of a variety of applications. A few example applications of the system 100 are described in more detail next.

In one example, the system 100 may implement image up-scaling operations. In particular, the writing system 104 may store an input image in the neural network 102, and in response to receiving a query image that is a lower resolution representation of the input image, the reading system 106 may process the query image to generate a reconstruction of the (higher resolution) input image.

In another example, the system 100 may implement a key-value data store. In particular, the writing system 104 may store an input data element that includes a "key" and a "value" in the neural network 102. Subsequently, the reading system 106 may process a query data element that includes only the key to generate a reconstruction of the input data element (i.e., including the value). The key and the value can each be any type of data, e.g., image data, text data, or audio data. In some cases, the respective portions of the input data element that correspond to the key and the value do not need to be pre-specified. That is, the reading system 106 can receive a query data element that includes an arbitrary portion of an input data element stored in the neural network 102 by the writing system 104, and can then retrieve the entire input data element from the neural network 102.

In another example, the system 100 may be implemented as part of a recommendation system. In particular, the writing system 104 may store data elements that each characterize a set of attributes of a respective user in the neural network 102. The reading system 106 may then process a query data element that characterizes only a proper subset of attributes of a query user to generate a retrieved data element specifying a full set of attributes that are predicted to correspond to the query user. For example, the system 100 may implement product recommendation operations, and the set of attributes of a user may include data specifying: (i) demographic attributes of the user (e.g., age, gender, location, and the like), and (ii) products used by the user (e.g., videos viewed by the user). In this example, the reading system 106 may process a query data element that only specifies demographic attributes of a user to generate a full set of attributes that are predicted to correspond to the user (e.g., including products used by the user). The full set of attributes that are predicted to correspond to the user can be used to make recommendations (e.g., product recommendations) to the user.

In another example, the system 100 may implement image search operations. In particular, the writing system 104 may store a set of input images in the neural network 102. The reading system 106 may process a query image to generate a reconstruction of a given input image that shares one or more characteristics of the query image (e.g., the query image and the given input image may both depict the same person).

In another example, the system 100 may implement text search operations. In particular, the writing system 104 may store multiple portions of text in the neural network 102. The reading system 106 may process a query data element that specifies a text fragment of text to generate a reconstruction of a larger portion of text that includes the text fragment.

In another example, the system 100 can be used by a reinforcement learning agent (e.g., a simulated agent or a robotic agent) that is interacting with an environment (e.g., a simulated environment or a real-world environment). The agent may use the writing system 104 to store experience tuples that each include: (i) an observation characterizing a state of the environment, (ii) an action performed by the agent in response to the observation, and (iii) a reward received by the agent as a result of performing the action. The agent may use the reading system to process a query experience tuple that includes only an observation and an action to generate a complete experience tuple, i.e., including a reconstruction of the reward received as a result of performing the action in response to the observation. The agent may use the complete experience tuple, e.g., to facilitate selecting actions to be performed in response to observations.

FIG. 2 shows: (i) a graph 202 that illustrates the energy values $E(x;\bar{\theta})$ generated by an associative memory neural network in accordance with initial neural network parameter values $\bar{\theta}$, and (ii) a graph 204 that illustrates the energy values $E(x;\bar{\theta})$ generated by the associative memory neural network in accordance with neural network parameter values $\theta$ after the writing system writes the set of data elements $\{x_1, x_2, x_3\}$ to the associative memory neural network. In each graph, the horizontal axis represents the space of possible data elements and the vertical axis represents energy values generated by the associative memory neural network by processing data elements. Referring to graph 204, it can be appreciated that the data elements written to the associative memory neural network achieve local minima of the energy values generated by the associative memory neural network.

The graph 204 further illustrates a sequence of energy values 206-A-D generated by the associative memory neural network for a query data element 208 that is provided to a reading system. The reading system iteratively adjusts the query data element by gradient descent to optimize a reading objective function, and in doing so, minimizes the energy value generated by the associative memory neural network by processing the query data element. After a final iteration of gradient descent, the reading system may output the retrieved data element 210 ("read($\bar{x};\theta$)"); it can be appreciated that the retrieved data element 116 is closely approximates the stored data element $x_3$.

Figure 3:
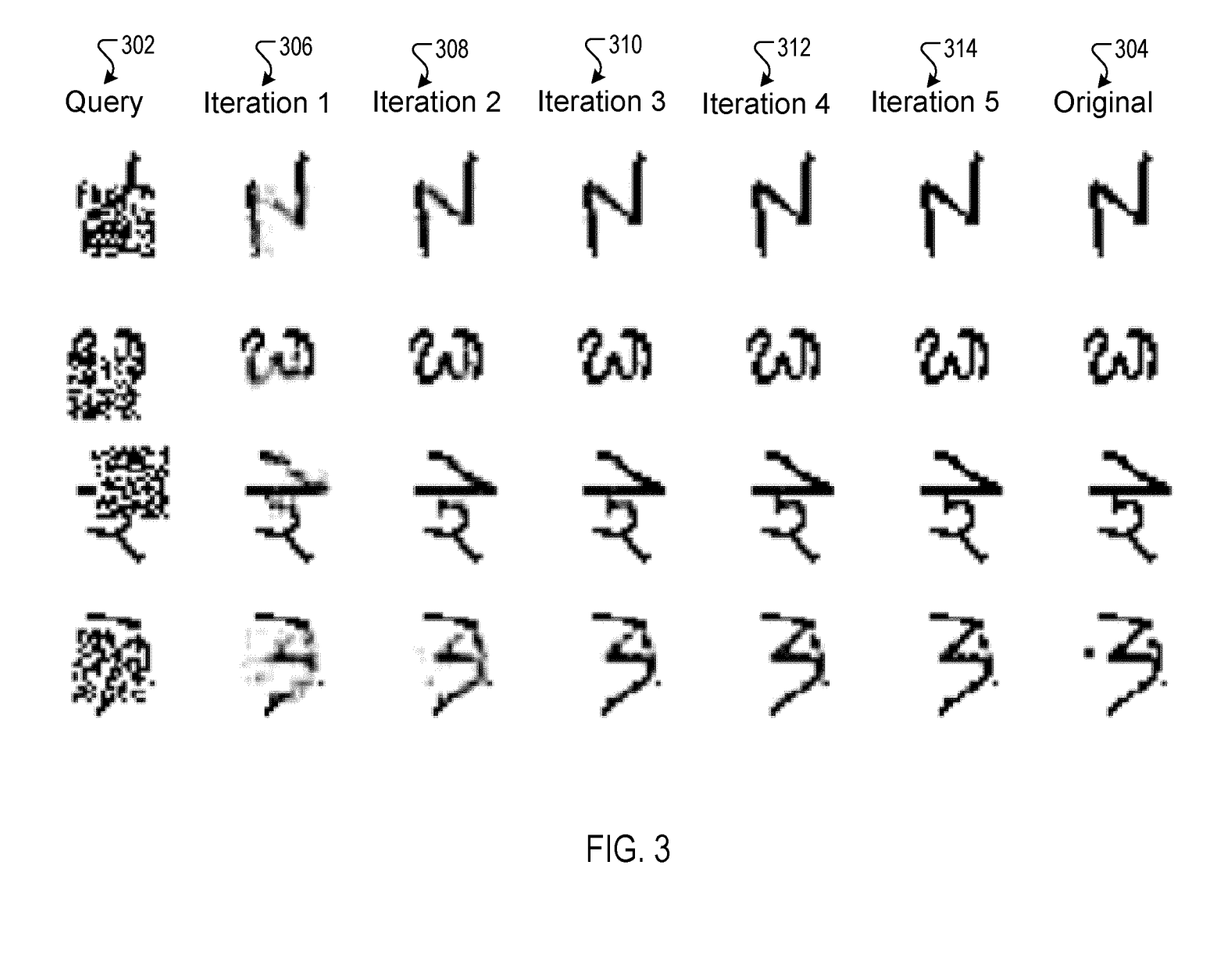
FIG. 3 shows a table that illustrates the evolution of query data elements over multiple iterations of gradient descent to optimize a reading objective function.

FIG. 3 shows a table that illustrates the evolution of query data elements provided to a reading system, e.g., the reading system 106 described with reference to FIG. 1, over multiple iterations of gradient descent to optimize a reading objective function. Each row of the table shows: a query data element 302 that is a distorted version of an original data element 304 that was stored in an associative memory neural network by a writing system (e.g., the writing system 104 of FIG. 1) and modified versions of the query data element over five iterations of gradient descent (306-314) performed by the reading system.

Figure 4:
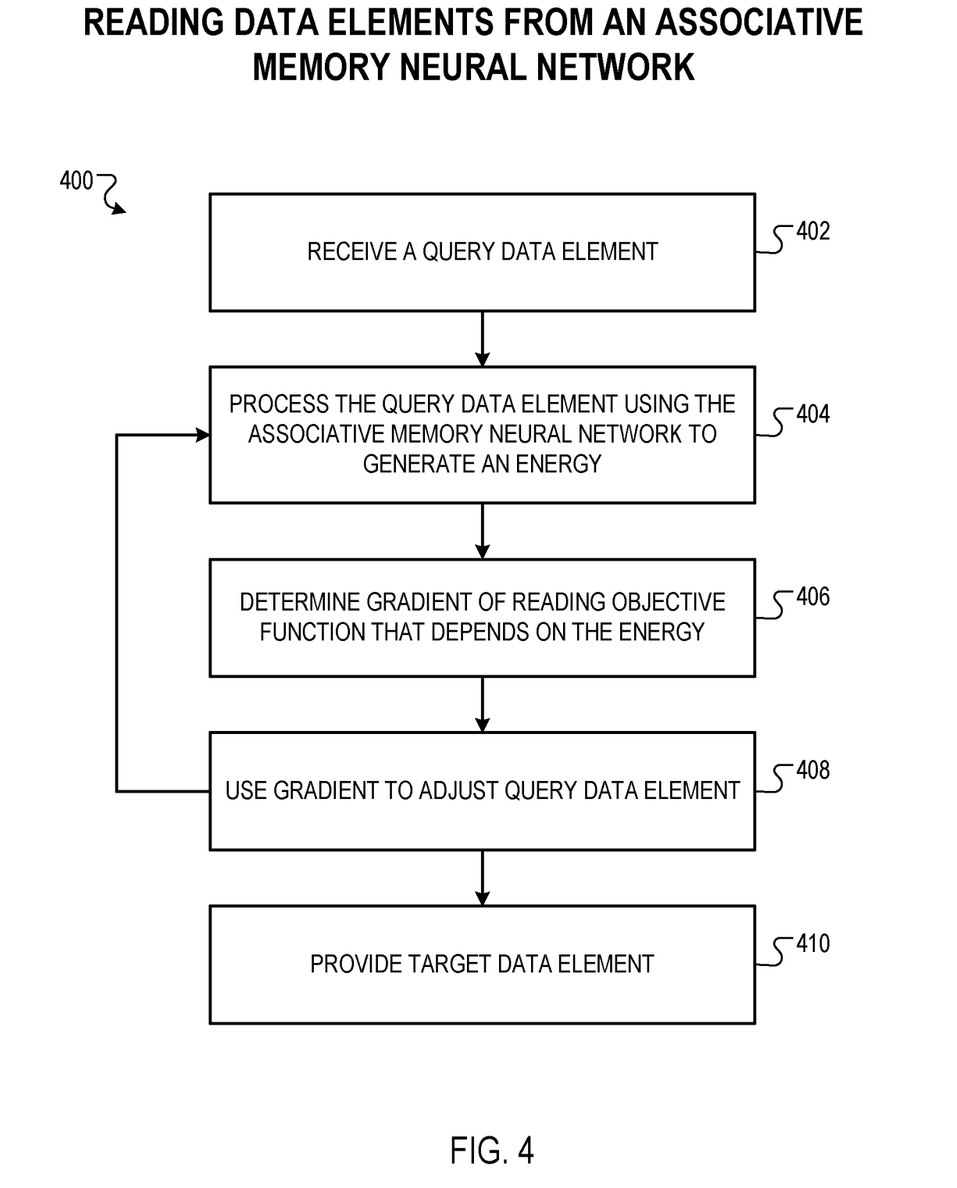
FIG. 4 is a flow diagram of an example process for reading data elements from an associative memory neural network.

FIG. 4 is a flow diagram of an example process 400 for reading data elements from an associative memory neural network. For convenience, the process 400 will be described as being performed by a system of one or more computers located in one or more locations. For example, an associative memory system, e.g., the associative memory system 100 of FIG. 1, appropriately programmed in accordance with this specification, can perform the process 400.

The system receives a query data element (given input) (402).

The system retrieves a target data element (target input) that is associated with the query data element from the associative memory neural network by performing steps 404-408, which are described in more detail next, at each of one or more iterations.

The system processes the query data element, using the associative memory neural network and in accordance with current values of the associative memory parameters, to generate an energy corresponding to the query data element (404).

The system determines a gradient of a reading objective function that depends on the energy corresponding to the query data element with respect to the query data element (406).

The system uses the gradient to adjust the query data element (408).

If the current iteration is not the final iteration, the system returns to step 404; otherwise, the system provides the query data element as the target data element that is associated with the query data element (410).

Figure 5:
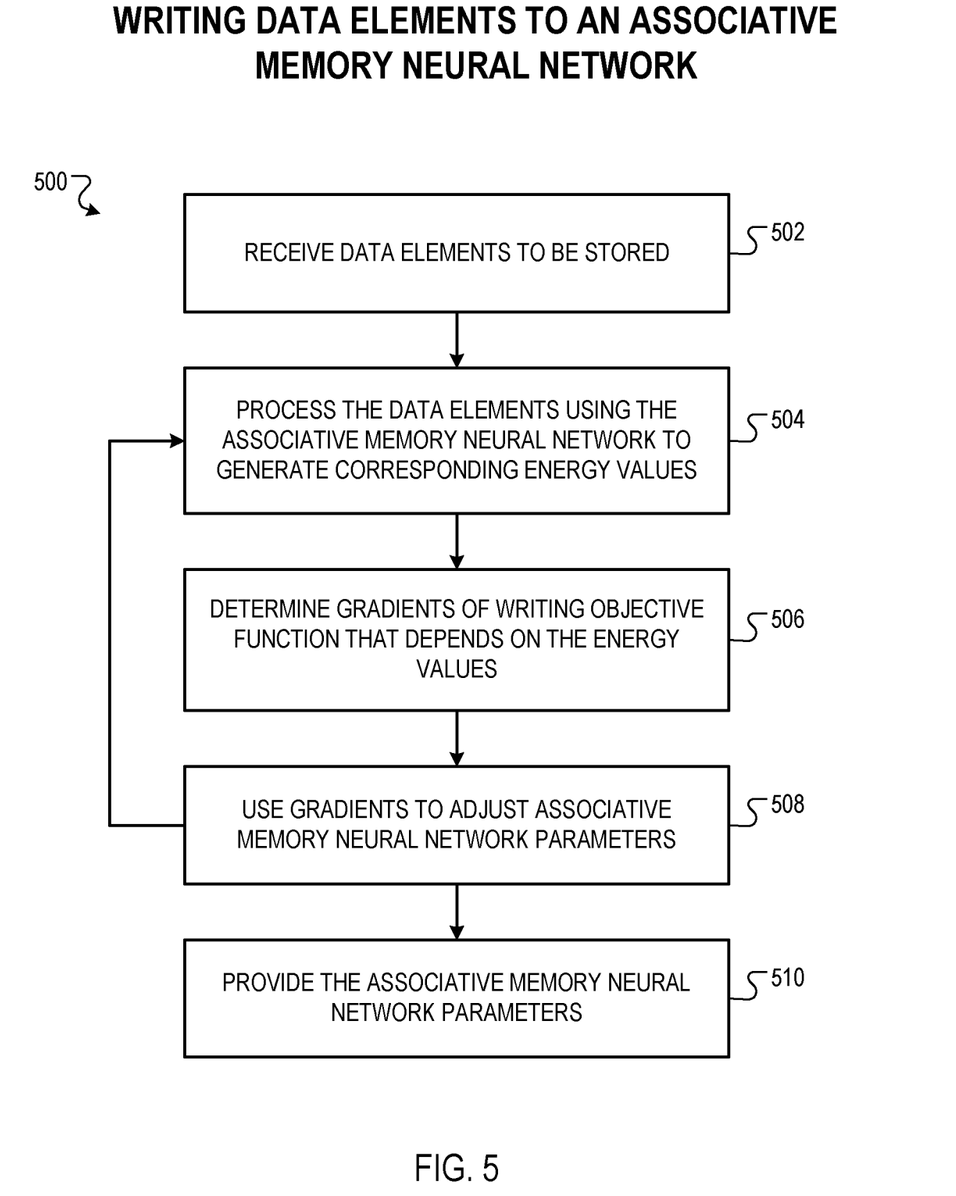
FIG. 5 is a flow diagram of an example process for writing data elements to an associative memory neural network.

FIG. 5 is a flow diagram of an example process 500 for writing data elements to an associative memory neural network. For convenience, the process 500 will be described as being performed by a system of one or more computers located in one or more locations. For example, an associative memory system, e.g., the associative memory system 100 of FIG. 1, appropriately programmed in accordance with this specification, can perform the process 500.

The system receives one or more data elements (inputs) to be stored (502).

The system stores the data elements using the associative memory neural network by performing steps 504-508, which are described in more detail next, at each of one or more iterations.

The system processes each of the data elements, using an associative memory neural network and in accordance with current values of the associative memory neural network parameters, to generate a respective energy value corresponding to each of the data elements (504).

The system determines gradients of a writing objective function that depends on the respective energy value corresponding to each of the data elements e.g. with respect to a specified subset of the associative memory neural network parameters (506).

The system uses the gradients to adjust the current values of the specified subset of the associative memory neural network parameters (508).

If the current iteration is not the final iteration, the system returns to step 504; otherwise, the system provides the final values of the associative memory neural network parameters (510).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A system comprising:
one or more computers; and
one or more storage devices communicatively coupled to the one or more computers, wherein the one or more storage devices store instructions that, when executed by the one or more computers, cause the one or more computers to implement:
an associative memory neural network having a plurality of associative memory parameters that is configured to process an input to generate an output that defines an energy corresponding to the input, wherein the energy corresponding to the input characterizes a likelihood that the input is stored in the associative memory parameters of the associative memory neural network, wherein the plurality of associative memory parameters are stored in one or more physical computer storage media; and
a reading subsystem that is configured to perform operations comprising:
receiving a given input;
retrieving a target input that is associated with the given input from the associative memory neural network by adjusting the given input using the associative memory neural network, comprising, at each of one or more iterations:
processing the given input, using the associative memory neural network and in accordance with current values of the associative memory parameters, to generate an energy corresponding to the given input;
determining a gradient of a reading objective function that depends on the energy corresponding to the given input with respect to the given input; and
using the gradient to adjust the given input; and
providing the given input after a final iteration of the one or more iterations as the target input that is associated with the given input; and
a writing subsystem that is configured to perform operations comprising:
receiving one or more inputs to be stored;
storing the inputs using the associative memory neural network, comprising, at each of one or more iterations:
processing each of the inputs, using the associative memory neural network and in accordance with current values of the plurality of associative memory parameters, to generate a respective energy corresponding to each of the inputs;

determining gradients of a writing objective function that depends on the energy corresponding to each of the inputs with respect to a specified subset of the associative memory parameters; and using the gradients to adjust the current values of the specified subset of the associative memory parameters;

wherein the writing objective function depends on a respective gradient of the energy corresponding to each of the inputs with respect to the specified subset of the associative memory parameters; and wherein the writing objective function depends on a respective magnitude of the gradient of the energy corresponding to each of the inputs with respect to the specified subset of associative memory parameters.

2. The system of claim 1, wherein the writing objective function depends on a difference between (i) current values of the specified subset of the associative memory parameters, and (ii) initial values of the specified subset of the associative memory parameters.

3. The system of claim 1, wherein the specified subset of the associative memory parameters is a proper subset of the associative memory parameters.

4. The system of claim 3, wherein the specified subset of the associative memory parameters comprises only the associative memory parameters corresponding to a proper subset of a set of neural network layers of the associative memory neural network.

5. The system of claim 4, wherein the proper subset of the set of neural network layers of the associative memory neural network comprise one or more highest layers of the associative memory neural network.

6. The system of claim 1, wherein the associative memory neural network is configured to process inputs that comprise one or more of: image data, text data, or audio data.

7. The system of claim 1, wherein the associative memory neural network comprises one or more convolutional neural network layers.

8. The system of claim 1, wherein the associative memory neural network comprises one or more recurrent neural network layers.

9. The system of claim 1, wherein using the gradient to adjust the given input by the reading subsystem comprises using the gradient to adjust the given input in accordance with a gradient descent optimization rule by the reading subsystem.

10. The system of claim 9, wherein the gradient descent optimization rule is a Nesterov momentum gradient descent optimization rule.

11. The system of claim 1, wherein the given input received by the reading subsystem is a partially known or distorted representation of the target input that is associated with the given input.

12. The system of claim 1, wherein:
the reading subsystem has one or more reading subsystem parameters that are used in retrieving target inputs from the associative memory neural network, the writing subsystem has one or more writing subsystem parameters that are used in storing inputs using the associative memory neural network, the reading objective function has one or more reading objective function parameters, and the writing objective function has one or more writing objective function parameters; and the system further comprises a training subsystem that is configured to jointly train the reading subsystem parameters, the writing subsystem parameters, the reading objective function parameters, the writing objective function parameters, and the associative memory parameters based on a reconstruction error objective function using meta-learning techniques.

13. The system of claim 12, wherein the reconstruction error objective function characterizes a similarity between: (i) a training input that is stored using the associative memory neural network by the writing subsystem, and (ii) a retrieved input that is provided by the reading subsystem as the training input.

14. The system of claim 12, wherein using reading subsystem parameters in retrieving a target input from the associative memory neural network comprises scaling the gradients of the reading objective function using reading subsystem parameters.

15. The system of claim 12, wherein using the writing subsystem parameters to store an input using the associative memory neural network comprises scaling the gradients of the writing objective function using writing subsystem parameters.

16. A method performed by one or more data processing apparatus, the method comprising:
receiving a given input;
retrieving a target input that is associated with the given input from an associative memory neural network by adjusting the given input using the associative memory neural network, wherein the associative memory neural network has a plurality of associative memory parameters and is configured to process an input to generate an output that defines an energy corresponding to the input, wherein the energy corresponding to the input characterizes a likelihood that the input is stored in the associative memory parameters of the associative memory neural network, wherein the plurality of associative memory parameters are stored in one or more physical computer storage media, wherein retrieving the target input that is associated with the given input comprises, at each of one or more iterations:
processing the given input, using the associative memory neural network and in accordance with current values of the associative memory parameters, to generate an energy corresponding to the given input;
determining a gradient of a reading objective function that depends on the energy corresponding to the given input with respect to the given input; and
using the gradient to adjust the given input; and
providing the given input after a final iteration of the one or more iterations as the target input that is associated with the given input;
wherein a writing subsystem has stored one or more inputs in the plurality of associate memory parameters by performing operations comprising:
receiving one or more inputs to be stored;
storing the inputs using the associative memory neural network, comprising, at each of one or more iterations:
processing each of the inputs, using the associative memory neural network and in accordance with current values of the plurality of associative memory parameters, to generate a respective energy corresponding to each of the inputs;
determining gradients of a writing objective function that depends on the energy corresponding to each of the inputs with respect to a specified subset of the associative memory parameters; and using the gradients to adjust the current values of the specified subset of the associative memory parameters;

wherein the writing objective function depends on a respective gradient of the energy corresponding to each of the inputs with respect to the specified subset of the associative memory parameters; and wherein the writing objective function depends on a respective magnitude of the gradient of the energy corresponding to each of the inputs with respect to the specified subset of associative memory parameters.

17. One or more non-transitory computer storage media storing instructions that when executed by one or more computers cause the one or more computers to perform operations comprising:

receiving a given input;

retrieving a target input that is associated with the given input from an associative memory neural network by adjusting the given input using the associative memory neural network, wherein the associative memory neural network has a plurality of associative memory parameters and is configured to process an input to generate an output that defines an energy corresponding to the input, wherein the energy corresponding to the input characterizes a likelihood that the input is stored in the associative memory parameters of the associative memory neural network, wherein the plurality of associative memory parameters are stored in one or more physical computer storage media, wherein retrieving the target input that is associated with the given input comprises, at each of one or more iterations:

processing the given input, using the associative memory neural network and in accordance with current values of the associative memory parameters, to generate an energy corresponding to the given input;

determining a gradient of a reading objective function that depends on the energy corresponding to the given input with respect to the given input; and using the gradient to adjust the given input; and providing the given input after a final iteration of the one or more iterations as the target input that is associated with the given input;

wherein a writing subsystem has stored one or more inputs in the plurality of associate memory parameters by performing operations comprising:

receiving one or more inputs to be stored;

storing the inputs using the associative memory neural network, comprising, at each of one or more iterations:

processing each of the inputs, using the associative memory neural network and in accordance with current values of the plurality of associative memory parameters, to generate a respective energy corresponding to each of the inputs;

determining gradients of a writing objective function that depends on the energy corresponding to each of the inputs with respect to a specified subset of the associative memory parameters; and using the gradients to adjust the current values of the specified subset of the associative memory parameters;

wherein the writing objective function depends on a respective gradient of the energy corresponding to each of the inputs with respect to the specified subset of the associative memory parameters; and wherein the writing objective function depends on a respective magnitude of the gradient of the energy corresponding to each of the inputs with respect to the specified subset of associative memory parameters.

18. The non-transitory computer storage media of claim 17, wherein the writing objective function depends on a difference between (i) current values of the specified subset of the associative memory parameters, and (ii) initial values of the specified subset of the associative memory parameters.

19. The non-transitory computer storage media of claim 17, wherein the specified subset of the associative memory parameters is a proper subset of the associative memory parameters.

20. The non-transitory computer storage media of claim 19, wherein the specified subset of the associative memory parameters comprises only the associative memory parameters corresponding to a proper subset of a set of neural network layers of the associative memory neural network.

* * * * *